(12) United States Patent
Dorrington et al.

(10) Patent No.: US 12,417,241 B2
(45) Date of Patent: Sep. 16, 2025

(54) CURATING AND GRAPHICALLY PRESENTING UNSTRUCTURED DATA BASED ON ANALYTICS

(71) Applicant: Schlumberger Technology Corporation, Sugar Land, TX (US)

(72) Inventors: Tracy Dorrington, Houston, TX (US); Chiao-Fang Hsu, Katy, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 307 days.

(21) Appl. No.: 17/593,013

(22) PCT Filed: Mar. 5, 2020

(86) PCT No.: PCT/US2020/021064
§ 371 (c)(1),
(2) Date: Sep. 3, 2021

(87) PCT Pub. No.: WO2020/181027
PCT Pub. Date: Sep. 10, 2020

(65) Prior Publication Data
US 2022/0147555 A1 May 12, 2022

Related U.S. Application Data

(60) Provisional application No. 62/814,090, filed on Mar. 5, 2019.

(51) Int. Cl.
*G06F 16/38* (2019.01)
*G06F 16/332* (2025.01)
(Continued)

(52) U.S. Cl.
CPC .......... *G06F 16/38* (2019.01); *G06F 16/3328* (2019.01); *G06F 16/3334* (2019.01);
(Continued)

(58) Field of Classification Search
CPC ...... G06F 16/38; G06F 16/387; G06F 16/345; G06F 16/34; G06F 16/3328; G06F 16/3334; G06F 16/951
See application file for complete search history.

(56) References Cited

U.S. PATENT DOCUMENTS

| | | | |
|---|---|---|---|
| 5,671,342 A | 9/1997 | Millier et al. | |
| 2002/0055868 A1* | 5/2002 | Dusevic | G06F 16/954 705/7.13 |

(Continued)

OTHER PUBLICATIONS

International Preliminary Report on Patentability of related International Patent Application No. PCT/US2020/021064 mailed Sep. 16, 2021, 7 pages.

(Continued)

*Primary Examiner* — Marc S Somers
(74) *Attorney, Agent, or Firm* — Jeffrey D. Frantz (57) ABSTRACT

A computer-implemented method, includes obtaining unstructured data content from one or more data sources; extracting analytics associated with the unstructured data content; determining presentation parameters for presenting the unstructured data content based on the extracted analytics; and displaying data representing the unstructured data content in a map view based on the presentation parameters.

19 Claims, 6 Drawing Sheets

(51) Int. Cl.
*G06F 16/3332* (2025.01)
*G06F 16/34* (2025.01)
*G06F 16/387* (2019.01)
*G06F 16/951* (2019.01)

(52) U.S. Cl.
CPC ............ *G06F 16/34* (2019.01); *G06F 16/345* (2019.01); *G06F 16/387* (2019.01); *G06F 16/951* (2019.01)

(56) References Cited

U.S. PATENT DOCUMENTS

| | | | | |
|---|---|---|---|---|
| 2002/0152222 | A1* | 10/2002 | Holbrook | ............... G06F 16/954 |
| 2004/0139100 | A1* | 7/2004 | Gottsman | ........... G06F 16/2428 |
| | | | | 707/999.102 |
| 2006/0197763 | A1 | 9/2006 | Harrison et al. | |
| 2007/0162298 | A1* | 7/2007 | Melton | ................. G06F 16/951 |
| | | | | 702/179 |
| 2008/0005099 | A1* | 1/2008 | Lyseggen | .............. G06F 16/951 |
| | | | | 707/999.005 |
| 2008/0033652 | A1 | 2/2008 | Hensley et al. | |
| 2009/0070297 | A1* | 3/2009 | Hadzima, Jr. | ......... G06F 16/951 |
| 2010/0114954 | A1* | 5/2010 | Sareen | .................. G06F 16/951 |
| | | | | 707/E17.108 |
| 2013/0018957 | A1* | 1/2013 | Parnaby | ............. G06Q 30/0203 |
| | | | | 709/204 |
| 2013/0138577 | A1* | 5/2013 | Sisk | ....................... G06Q 40/04 |
| | | | | 705/36 R |
| 2014/0089776 | A1 | 3/2014 | Pilskalns | |
| 2015/0186531 | A1 | 7/2015 | Agarwal et al. | |
| 2016/0210357 | A1* | 7/2016 | Wohltman | .......... G06F 16/9537 |
| 2019/0340548 | A1* | 11/2019 | Bhattacharjya | .......... G06N 5/01 |

OTHER PUBLICATIONS

Search Report and Written Opinion of related International Patent Application No. PCT/US2020/021064 mailed Apr. 21, 2020.
The PageRank Citation Ranking: Bringing Order to the Web, Jan. 29, 1998, 17 pages. Retrieved from http://ilpubs.stanford.edu:8090/422/1/1999-66.pdf.

* cited by examiner

CURATING AND GRAPHICALLY PRESENTING UNSTRUCTURED DATA BASED ON ANALYTICS

CROSS-REFERENCE TO RELATED APPLICATIONS

This application is a National Stage Entry of International Application No. PCT/US2020/021064, filed Mar. 5, 2020, which claims priority to U.S. Provisional Patent Application No. 62/814,090, filed Mar. 5, 2019, and is incorporated herein by reference in its entirety.

BACKGROUND

News content may be provided by a vast range of news data sources. Various applications and outlets are available for disseminating and presenting news content to users (e.g., viewers and readers). As some examples, news may be presented via webpages, computer applications (e.g., hosted by mobile, desktop, Smart TVs, etc.), television broadcast, Internet channel broadcast, etc. News outlets typically prioritize the reporting of news that is expected to draw the highest ratings.

SUMMARY

Embodiments of the disclosure may provide a computer implemented including obtaining unstructured data content from one or more data sources, extracting analytics associated with the unstructured data content, determining presentation parameters for presenting the unstructured data content based on the extracted analytics, and displaying data representing the unstructured data content in a map view based on the presentation parameters.

In an embodiment, the data representing the unstructured data content news comprises a data point in the map view, wherein the data point represents one or more news items. In an embodiment, the method may further include receiving a user selection of the data point, and providing additional information regarding the one or more news items represented by the data point. The presentation parameters define an appearance of the data point. The display parameters may include at least one of: size, color, shape, shading, pattern, and icon.

In an embodiment, the determining presentation parameters is further based on relevancy or display rules. The analytics may include at least one of: subject, entity, company, agency, news source identification, sentiment information, and geographic information.

In an embodiment, the extracting the analytics comprises applying natural language processing (NLP) to the unstructured data content. The extracting the analytics comprises building a knowledge graph. In an embodiment, the unstructured data content may be related to oil and gas (or other types of energy sources) discovery.

Embodiments of the disclosure may also provide a computing system, including one or more processors, and a memory system comprising one or more non-transitory computer-readable media storing instructions that, when executed by at least one of the one or more processors, cause the computing system to perform operations. The operations may include: obtaining unstructured data content from one or more data sources, extracting analytics associated with the unstructured data content, determining presentation parameters for presenting the unstructured data content based on the extracted analytics, and displaying data representing the unstructured data content in a map view based on the presentation parameters.

Embodiments of the disclosure may further provide a non-transitory computer-readable medium storing instructions that, when executed by one or more processors of a computing system, cause the computing system to perform operations. The operations may include obtaining unstructured data content from one or more data sources, extracting analytics associated with the unstructured data content, determining presentation parameters for presenting the unstructured data content based on the extracted analytics, and displaying data representing the unstructured data content in a map view based on the presentation parameters.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Unstructured data may include data that does not have a predefined data model. For example, unstructured data may include text-heavy data such as news articles, publications, social media posts, journal papers, acquisition reports, processing reports, interpretation reports, presentation documents, etc. One example of unstructured data may include news-related content. With the level of news content and other unstructured data available at any given time, it is time consuming for an individual to ensure that they are "keeping up" with all news items that is relevant to them. In fact, in many situations, it may be impossible for an individual to remain apprised of relevant, and sometimes, critical and valuable news that may affect planning decisions in which such decisions may be affected by world events. As one illustrative example, current news and world events may impact planning decisions in various fields, such as in the field of oil and gas exploration and discovery. However, news relevant to planning decisions may not necessarily be reported at the "forefront" or prioritized for reporting by news sources, since news outlets typically prioritize the reporting of news that is expected to draw the highest ratings. In this situation, news items relevant to an individual (e.g., a planner) may be missed entirely, or the amount of information relating to the news item may be insufficient. Accordingly, aspects of the present disclosure may include a system and/or method to extract analytics data from unstructured data sources (e.g., news content sources), identify and curate items relevant to a user based on the analytics, and generate a graphical geographical presentation of data points (e.g., on a geographic map) in which a data point may represent one or more unstructured data items (e.g., news items) in a common geographic location and in which the data further represent the analytics of the one or more unstructured data items.

As described herein, "unstructured data" may include news related items, news articles, publications, social media posts, journal papers, acquisition reports, processing reports, interpretation reports, presentation documents, etc. As described herein, analytics may include attributes (e.g., subject, type of news, entity, agency, weblink, news source identification information, etc.), geographic location, sentiment, and/or any other variety of information or data relating to unstructured source data and/or news content. In some embodiments, the data point's appearance (e.g., size, shape, color, shading, icon, etc.) may represent the attributes and/or analytics data of the data items represented by the data point (e.g., news items in a common geographic location). In this way, from the graphical presentation of the data points, a user may quickly identify world events that may affect planning decisions, the locations associated with these events, and the level to which these events may affect the planning decisions.

As an example, a user may select a data point on the graphical map to identify data items (e.g., news items) affecting a geographic region. By selecting the data point, the user may be presented with a list of news content (e.g., weblinks to articles/videos, television/internet channels, etc.) and other data relating to the news content (e.g., subject, type, location, entity, agency, sentiment, etc.). In this way, the dissemination and presentation of news content for an individual user is improved.

In some embodiments, aspects of the present disclosure may prioritize content (e.g., news content) for an individual user, and may graphically present the content (e.g., in the form of a data points on a geographic map representing a location associated with the news content). Further, aspects of the present disclosure may perform sentiment analysis to determine a sentiment of news events as they relate to planning decisions. In some embodiments, the sentiment of news content may be graphically presented such that a user may quickly and easily identify the sentiment when making planning decisions. As described herein, aspects of the present disclosure may intake a vast amount of unstructured data, filter the unstructured data based on relevancy, and present a graphical representation of the unstructured data in the form of data points whose appearance may quickly inform the user regarding the relevancy, sentiment, prioritization/ranking, or other attribute regarding items (e.g., news items) represented by the data point. As an illustrative example, a data point of a relatively large size and having a particular color (e.g., red) may draw the user's attention and signify to the user that a significant number of events with a negative sentiment are occurring in a particular geographic location (e.g., a geographic location in which the data point is presented on a map).

In some embodiments, aspects of the present disclosure may integrate the use of rules, personalization information, and knowledge regarding various industries to determine the level of relevancy of news content. Additionally, or alternatively, aspects of the present disclosure may implement or integrate natural language processing (NLP), artificial intelligence (AI), sentiment analysis, historical user feedback, etc., to determine relevancy levels, as well as presentation/appearance parameters for data points representing news content. In some embodiments, the presentation parameters may represent the relevancy levels, the type of news content, the sentiment of the new content, and/or other attributes relating to the news content. As illustrative examples, presentation parameters of data points may include the size of the data point, the shape of the data point, the color/shading pattern of the data point, an icon or graphic, etc. That is, different news content or news events may be represented by data points of different sizes, shapes, colors/shadings, icon, etc. based on their varying relevancies, sentiments, attributes, etc. In this way, a user (e.g., a planner or news consumer) may more easily identify news content most relevant for them. Moreover, aspects of the present disclosure improve user interfaces for presenting news content in a way that improves the speed at which news content is identified and presented to a user. For example, using the techniques and user interfaces described herein, a user may more quickly identify relevant news content in which the relevancy is accurate to the user's interest.

In some embodiments, the system and method, described herein, may provide a workspace/map canvas, which provides the user with an experience of awareness of the current events around the globe relevant to their exploration efforts. At a glance, the user may quickly obtain an overview of the latest news content and understand the news content temporally and spatially. For example, using the techniques and user interfaces described herein, a user may easily identify news relating to policy in a certain area and the impact of the policy on oil/gas exploration, a location in the world where investment in oil field is occurring, where exploration activity is changing/shifting, which companies are most active in which areas, etc.

In some embodiments, news analytics, after being processed, may be used as an input into a modeling system in which a model may be based on current news events (e.g., an oil/gas exploration modeling system). That is, news content may not only be presented and summarized for a user, but may be used as an input into a model. As an example, aspects of the present disclosure may identify news content having a set of attributes and associated with a particular geographic location. This news content may be converted into an input for a model which may affect the model's output. As one example, news content having a set of attributes may be converted into an input for an oil/gas exploration model, thereby potentially affecting an oil/gas exploration decision. Other models may be used in conjunction with the processes described herein. That is, the oil/gas exploration model is merely one example model.

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the present disclosure. The first object or step, and the second object or step, are both, objects or steps, respectively, but they are not to be considered the same object or step.

The terminology used in the description herein is for the purpose of describing particular embodiments and is not intended to be limiting. As used in this description and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques, and workflows that are in accordance with some embodiments. Some operations in the processing procedures, methods, techniques, and workflows disclosed herein may be combined and/or the order of some operations may be changed.

Figure 1:
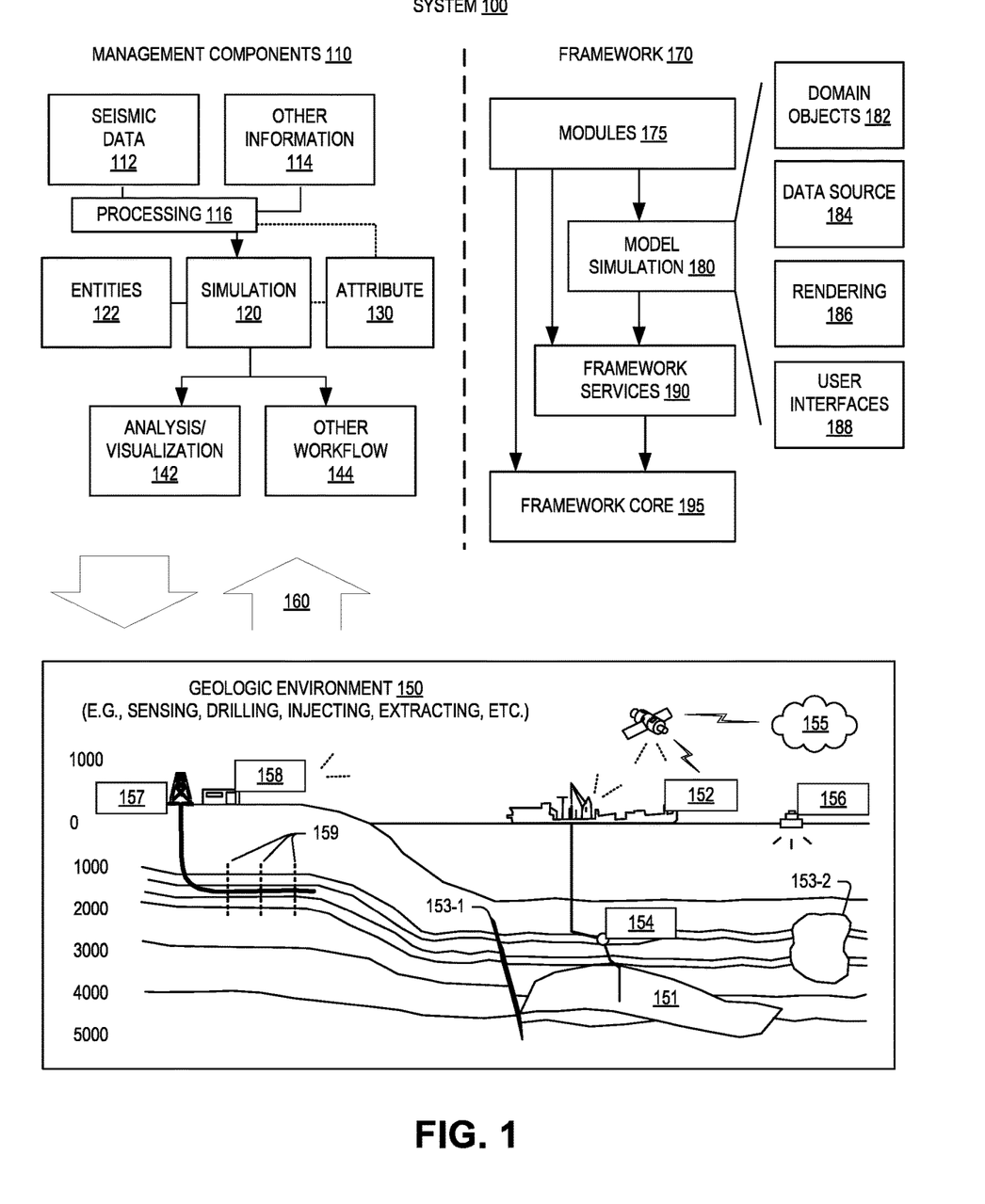
FIG. 1 illustrates an example of a system that includes various management components to manage various aspects of a geologic environment, according to an embodiment.

FIG. 1 illustrates an example of a system 100 that includes various management components 110 to manage various aspects of a geologic environment 150 (e.g., an environment that includes a sedimentary basin, a reservoir 151, one or more faults 153-1, one or more geobodies 153-2, etc.). For example, the management components 110 may allow for direct or indirect management of sensing, drilling, injecting, extracting, etc., with respect to the geologic environment 150. In turn, further information about the geologic environment 150 may become available as feedback 160 (e.g., optionally as input to one or more of the management components 110).

In the example of FIG. 1, the management components 110 include a seismic data component 112, an additional information component 114 (e.g., well/logging data), a processing component 116, a simulation component 120, an attribute component 130, an analysis/visualization component 142 and a workflow component 144. In operation, seismic data and other information provided per the components 112 and 114 may be input to the simulation component 120.

In an example embodiment, the simulation component 120 may rely on entities 122. Entities 122 may include earth entities or geological objects such as wells, surfaces, bodies, reservoirs, etc. In the system 100, the entities 122 can include virtual representations of actual physical entities that are reconstructed for purposes of simulation. The entities 122 may include entities based on data acquired via sensing, observation, etc. (e.g., the seismic data 112 and other information 114). An entity may be characterized by one or more properties (e.g., a geometrical pillar grid entity of an earth model may be characterized by a porosity property). Such properties may represent one or more measurements (e.g., acquired data), calculations, etc.

In an example embodiment, the simulation component 120 may operate in conjunction with a software framework such as an object-based framework. In such a framework, entities may include entities based on pre-defined classes to facilitate modeling and simulation. A commercially available example of an object-based framework is the MICROSOFT® .NET® framework (Redmond, Washington), which provides a set of extensible object classes. In the .NET® framework, an object class encapsulates a module of reusable code and associated data structures. Object classes can be used to instantiate object instances for use in by a program, script, etc. For example, borehole classes may define objects for representing boreholes based on well data.

In the example of FIG. 1, the simulation component 120 may process information to conform to one or more attributes specified by the attribute component 130, which may include a library of attributes. Such processing may occur prior to input to the simulation component 120 (e.g., consider the processing component 116). As an example, the simulation component 120 may perform operations on input information based on one or more attributes specified by the attribute component 130. In an example embodiment, the simulation component 120 may construct one or more models of the geologic environment 150, which may be relied on to simulate behavior of the geologic environment 150 (e.g., responsive to one or more acts, whether natural or artificial). In the example of FIG. 1, the analysis/visualization component 142 may allow for interaction with a model or model-based results (e.g., simulation results, etc.). As an example, output from the simulation component 120 may be input to one or more other workflows, as indicated by a workflow component 144.

As an example, the simulation component 120 may include one or more features of a simulator such as the ECLIPSE™ reservoir simulator (Schlumberger Limited, Houston Texas), the INTERSECT' reservoir simulator (Schlumberger Limited, Houston Texas), etc. As an example, a simulation component, a simulator, etc. may include features to implement one or more meshless techniques (e.g., to solve one or more equations, etc.). As an example, a reservoir or reservoirs may be simulated with respect to one or more enhanced discovery techniques (e.g., consider a thermal process such as SAGD, etc.).

In an example embodiment, the management components 110 may include features of a commercially available framework such as the PETREL® seismic to simulation software framework (Schlumberger Limited, Houston, Texas). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of modeling, simulating, etc.).

In an example embodiment, various aspects of the management components 110 may include add-ons or plug-ins that operate according to specifications of a framework environment. For example, a commercially available framework environment marketed as the OCEAN® framework environment (Schlumberger Limited, Houston, Texas) allows for integration of add-ons (or plug-ins) into a PETREL® framework workflow. The OCEAN® framework environment leverages .NET® tools (Microsoft Corporation, Redmond, Washington) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

FIG. 1 also shows an example of a framework 170 that includes a model simulation layer 180 along with a framework services layer 190, a framework core layer 195 and a modules layer 175. The framework 170 may include the commercially available OCEAN® framework where the model simulation layer 180 is the commercially available PETREL® model-centric software package that hosts OCEAN® framework applications. In an example embodiment, the PETREL® software may be considered a data-driven application. The PETREL® software can include a framework for model building and visualization.

As an example, a framework may include features for implementing one or more mesh generation techniques. For example, a framework may include an input component for receipt of information from interpretation of seismic data, one or more attributes based at least in part on seismic data, log data, image data, etc. Such a framework may include a mesh generation component that processes input information, optionally in conjunction with other information, to generate a mesh.

In the example of FIG. 1, the model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for application user interface components.

As an example, the domain objects 182 can include entity objects, property objects and optionally other objects. Entity objects may be used to geometrically represent wells, surfaces, bodies, reservoirs, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a modeling session, a user may store a project. At a later time, the project can be accessed and restored using the model simulation layer 180, which can recreate instances of the relevant domain objects.

In the example of FIG. 1, the geologic environment 150 may include layers (e.g., stratification) that include a reservoir 151 and one or more other features such as the fault 153-1, the geobody 153-2, etc. As an example, the geologic environment 150 may be outfitted with any of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource discovery, etc. Other equipment 156 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or instead include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

As mentioned, the system 100 may be used to perform one or more workflows. A workflow may be a process that includes a number of worksteps. A workstep may operate on data, for example, to create new data, to update existing data, etc. As an example, a may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL® software, for example, that operates on seismic data, seismic attribute(s), etc. As an example, a workflow may be a process implementable in the OCEAN® framework. As an example, a workflow may include one or more worksteps that access a module such as a plug-in (e.g., external executable code, etc.).

Embodiments of the disclosure may provide a system and method that facilitate aggregating and understanding available news relevant to oil and gas (O&G) exploration in such a way that it provides insights to the most current trending topics. Aiming to reorganize and summarize the news to help redirect user's focus as they browse in a map (e.g., of an exploration and production (E&P) platform such as DELPHI™) to also understand temporally and spatially the most relevant and popular (intensity, polarity) information about the objects users care about.

Figure 2:
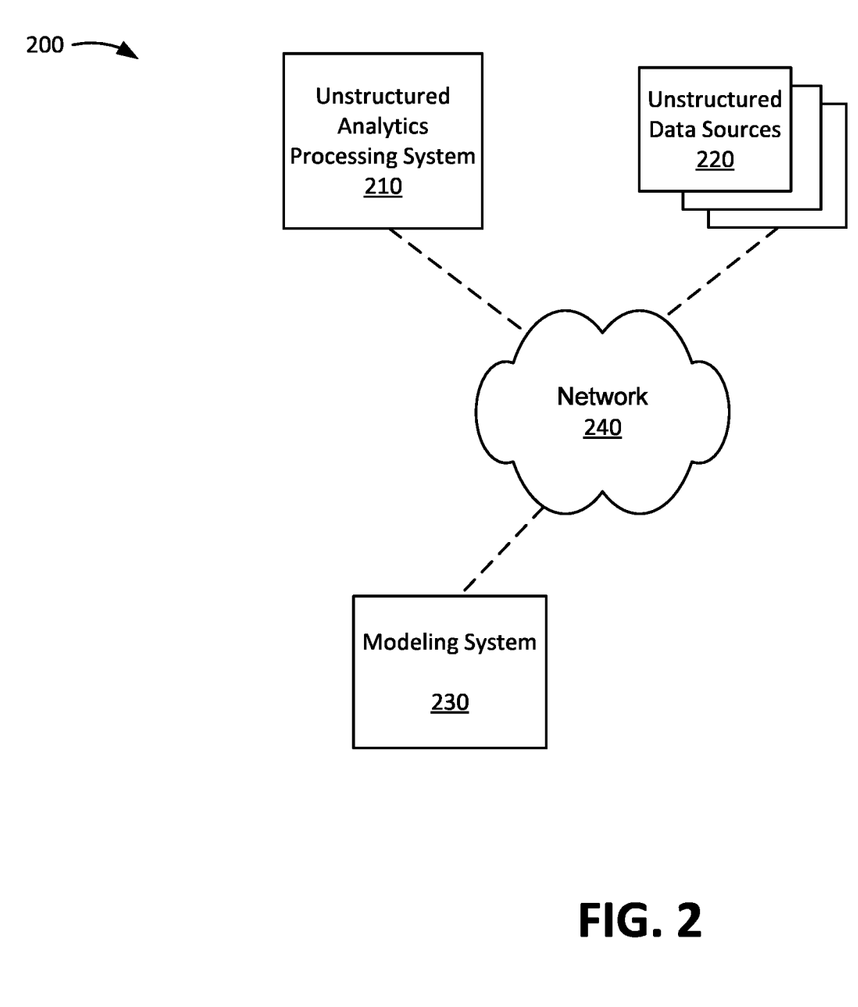
FIG. 2 illustrates a flowchart of a method for aggregating and curating news data in an oil and gas exploration and production platform, according to an embodiment.

FIG. 2 illustrates an example environment in accordance with aspects of the present disclosure. As shown in FIG. 2, environment 200 includes a unstructured analytics processing system 210, unstructured data sources 220, a modeling system 230, and a network 240.

The unstructured analytics processing system 210 may include one or more computing devices that obtains any variety of unstructured data from one or more unstructured data sources 220. In some embodiments, the unstructured analytics processing system 210 may receive unstructured data, such as news-related content, electronic or web-based news content, text news articles, news video reports, news audio reports, discussion board content, social media content, journal papers, acquisition reports, processing reports, interpretation reports, presentation documents, etc. In some embodiments, the unstructured analytics processing system 210 may "crawl" or monitor content stored or provided by the unstructured data sources 220. The unstructured analytics processing system 210 may extract analytics data from the unstructured data and process the unstructured data to determine a manner in which the unstructured data should be presented to a user. For example, the unstructured analytics processing system 210 may transcribe audio into text, perform natural language processing on the unstructured data to determine sentiment, determine the relevancy of the unstructured data based on a set of rules (e.g., user defined rules, industry relevancy data, historical user feedback, sentiment analysis, etc.), geocode the news content, and present the news content (e.g., in a geographic map). In some embodiments, the unstructured data, after being processed by the unstructured analytics processing system 210, may be used as an input into a modeling system in which a model may be based on current news events (e.g., an oil/gas exploration modeling system).

The unstructured data sources 220 may include one or more computing devices that includes any variety of unstructured data previously mentioned. In some embodiments, the unstructured data sources 220 may include webservers hosting news-based webpages, applications, discussion boards, social media platforms, public news agencies, etc. In some embodiments, the unstructured data sources 220 need not necessarily be a system or service dedicated to providing news content, rather, the unstructured data sources 220 may host any variety of content other than news content. As an example, the unstructured data sources 220 may host a social media platform that may provide news content (e.g., news content posted by users of the social media platform). The unstructured data sources 220 may provide the news content to the unstructured analytics processing system 210 on either a push and/or pull basis. In some embodiments, a pipeline may connect the unstructured data sources 220 to the unstructured analytics processing system 210 for more efficient news content transmission, although news content may be transmitted using any variety of networks/pipelines.

The modeling system 230 may include one or more computing devices that may produce any variety of models based on news content (e.g., oil/gas exploration). In some embodiments, the processed news analytics data (e.g., from the unstructured analytics processing system 210) may be used as an input into a model produced by the modeling system 230. As one illustrative example, the modeling system 230 may produce an oil/gas exploration model in which processed news analytics (e.g., processed by the unstructured analytics processing system 210) may be used as an input into the oil/gas exploration model.

The network 240 may include network nodes and one or more wired and/or wireless networks. For example, the network 240 may include a cellular network (e.g., a second generation (2G) network, a third generation (3G) network, a fourth generation (4G) network, a fifth generation (2G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the network 240 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks. In embodiments, the network 240 may include copper transmission cables, optical transmission fibers, wireless transmission, routers, firewalls, switches, gateway computers and/or edge servers.

The quantity of devices and/or networks in the environment 200 is not limited to what is shown in FIG. 2. In practice, the environment 200 may include additional devices and/or networks; fewer devices and/or networks; different devices and/or networks; or differently arranged devices and/or networks than illustrated in FIG. 2. Also, in some implementations, one or more of the devices of the environment 200 may perform one or more functions described as being performed by another one or more of the devices of the environment 200. Devices of the environment 200 may interconnect via wired connections, wireless connections, or a combination of wired and wireless connections.

Figure 3:
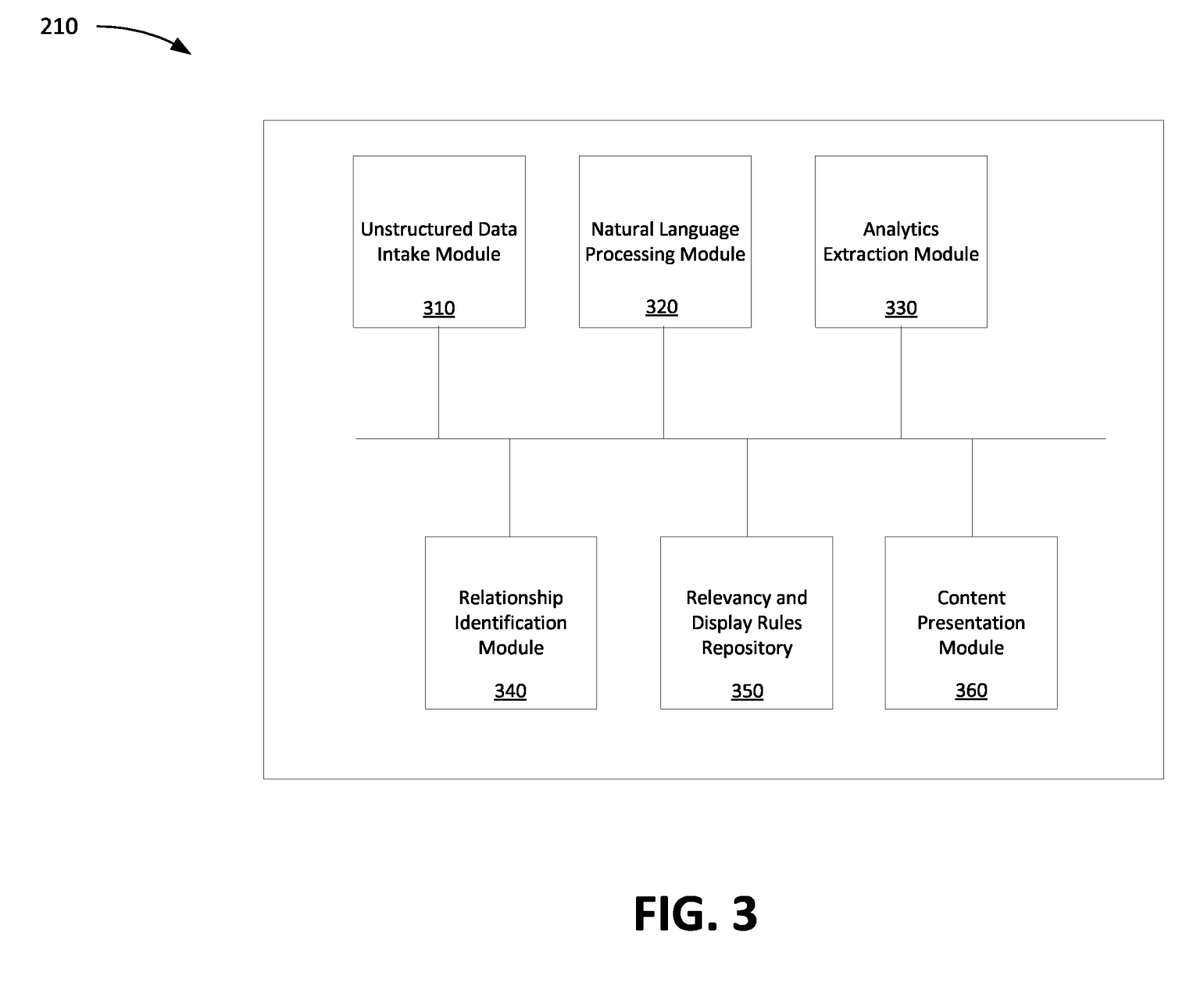
FIG. 3 illustrates a map or workspace of an exploration and production platform including aggregated and prioritized news information and analytics, according to an embodiment.

FIG. 3 illustrates a block diagram of example components of an unstructured analytics processing system 210 in accordance with aspects of the present disclosure. As shown in FIG. 3, the unstructured analytics processing system 210 may include an unstructured data intake module 310, a natural language processing module 320, an analytics extraction module 330, a relationship identification module 340, a relevancy and display rules repository 350, and a content presentation module 360. In embodiments, the unstructured analytics processing system 210 may include additional or fewer components than those shown in FIG. 3. In embodiments, separate components may be integrated into a single computing component or module. Additionally, or alternatively, a single component may be implemented as multiple computing components or modules.

In embodiments, the unstructured data intake module 310 may include one or more program modules that receives unstructured data from one or more unstructured data sources 220 (e.g., text articles, webpages, videos, audio, news broadcasts, etc.). In some embodiments, the unstructured data intake module 310 may "crawl" the unstructured data sources 220 to obtain news content. Additionally, or alternatively, the unstructured data intake module 310 may communicate with an external service that crawls the unstructured data sources 220 and obtains news content. In some embodiments, the unstructured data intake module 310 may request news content (e.g., on a pull basis), and/or may receive news content on a push or subscription basis. In some embodiments, the unstructured data intake module 310 may obtain news content in the form of raw unstructured data that does not have a predefined data model. For example, unstructured data may include text-heavy data such as news articles, publications, social media posts, journal papers, acquisition reports, processing reports, interpretation reports, presentation documents, etc. In some embodiments, the unstructured data intake module 310 may perform audio transcription to convert audio into text. The unstructured data intake module 310 may mine either unstructured or structured data, however, mining of unstructured data may facilitate faster retrieval of text-heavy documents with keywords. In some embodiments, the unstructured data intake module 310 may utilize search engines and various search techniques, such as n-gram and inverted index to improve lookup time of documents from the short keywords input. As described herein, the unstructured data intake module 310 may generate respective data records (e.g., in a data structure) for respective news items (e.g., news article, audio/video for a news topic, etc.) included in the news content.

The natural language processing module 320 may include one or more program modules that applies natural language processing (NLP) to the unstructured data obtained by the unstructured data intake module 310. As described herein, NLP may be used to extract analytics, patterns, sentiments, and insights from raw unstructured data, as well as perform sentiment analysis of unstructured data. In some embodiments, the sentiment of each unstructured data item (e.g., news item) may be scored on a magnitude intensity scale (e.g., on a scale, such as a scale from −1 to 1, in which −1 indicates the highest level of negative sentiment intensity, 1 indicates the highest level of positive sentiment intensity, and 0 indicates a neutral sentiment).

The analytics extraction module 330 may include one or more program modules that extracts analytics from the unstructured data (obtained by the unstructured data intake module 310). In some embodiments, the analytics extraction module 330 may use the natural language processing module 320 to apply NLP to the unstructured data to extract analytics associated with each news item. As described herein, analytics may include attributes (e.g., subject, type of news, entity, agency, weblink, news source identification information, etc.), geographic location, sentiment, and/or any other variety of information or metadata relating to news content included in the unstructured data. In some embodiments, the analytics extraction module 330 may use additional or alternative tools and techniques to extract the analytics. In general, the analytics extraction module 330 may convert unstructured news content/raw data into structured analytics and link the structured analytics data to corresponding data records associated with respective items (e.g., news items). In this way, the analytics extraction module 330 may generate and maintain a data structure having data records of respective items (e.g., news items) and the analytics associated with the news items being linked to their corresponding data records.

The relationship identification module 340 may include one or more program modules that identifies relationships between a data item (e.g., news item) and any variety of subjects or domains. In some embodiments, the relationship identification module 340 may analyze the extracted analytics for a news item (e.g., extracted by the analytics extraction module 330) and identify the relationship between the news item and a variety of subjects and domains (e.g., the relationship a news item has to an entity, a company, a task, a project, etc.). Additional levels of relationship analysis may be performed. Using the identified relationships, the relationship identification module 340 may build a knowledge graph that may be later presented to the user and may also be used to help identify/prioritize news items of interest.

The relevancy and display rules repository 350 may include one or more storage devices that stores information identifying rules defining relevancy of content and data items (e.g., news items). Further, the relevancy and display rules repository 350 may store information identifying a manner in which the content is to be displayed (e.g., on a geographic map). More specifically, the relevancy and display rules repository 350 may store information scoring or ranking rules that identify weights and/or other rules used to score or rank news items based on the news items' attributes/analytics. In some embodiments, the scoring and/or ranking rules may be user defined. Additionally, or alternatively, the scoring and/or ranking rules may be updated dynamically based on industry trends indicating attributes of interest to a particular industry, user historical feedback indicating attributes of news items considered to be relevant to a user, user job role, user's industry, user's interests, user's social media activity indicting the user's interest, etc. In some embodiments, the scoring and/or ranking rules may specify attributes such as sentiment, entity, location, subject, company, basin information, field, etc. As an example, greater sentiment magnitude values may be weighed higher than lower sentiment magnitude values. As another example, news items associated with a particular geographic location may be weighed higher than news items from other locations. As another example, news items related to one subject may be weighed higher than news items related to a different subject (e.g., based on the user's job roles, user interests, social media activity, etc.). In some embodiments, the relevancy and display rules repository 350 may use the relationship information and/or the knowledge graph (e.g., produced by the relationship identification module 340) to prioritize, rank, and/or score news items.

As further described herein, the relevancy and display rules repository 350 may store information defining a manner in which news content and news items are to be presented (e.g., in a graphical geographic map). As one example, the relevancy and display rules repository 350 may store display rules indicating display parameters of data points representing one or more news items in which the data points are presented in a graphical user interface (e.g., in the form of a geographical map). Example display parameters may include size, shape, color, shading, icons, etc. In some embodiments, the display rules may define the display parameters based on the rankings/scorings of news items, sentiment information, entity information, quantity of news items having a set of attributes, or the like. As one example, the relevancy and display rules repository 350 may store a display rule specifying that a data point representing multiple news items may be relatively larger when a relatively larger number of news items are present. As another example, the relevancy and display rules repository 350 may store a display rule specifying that a data point may be relatively larger, or of a certain color (e.g., red) when news items have a relatively stronger negative sentiment. In this way, news items/news content may be displayed in a way that draws the user's attention to higher priority/higher ranking news items. In general, the relevancy and display rules repository 350 may store any variety of display rules that define the manner in which data points are displayed based on attributes of news items represented by the data points. Further, the relevancy and display rules repository 350 may store display rules that define news to recommend to the user (e.g., to draw the user's attention to high ranking news items).

The content presentation module 360 may include one or more program modules that accesses news items, the extracted attributes of the news items, and the relevancy and display rules (e.g., from the relevancy and display rules repository 350). The content presentation module 360 executes and/or implements the display rules and displays content, such as news content (e.g., in the form of data points representing multiple news items in a geographic map presented in a graphical user interface). More specifically, the content presentation module 360 may present data points with various sizes, colors, shapes, icons, shadings, etc. based on the attributes of news items represented by the data points. The presentation of the data points may also represent the relevancy rankings of news items, sentiment of the news items, etc. In this way, a user may quickly identify news items having relevancy to the user.

As further described herein, a data point may be selected by the user. For example, a user may select a data point indicating one or more relevant news items. Upon selection of the data point, the content presentation module 360 may present additional information associated with one or more news items represented by the data point (e.g., sentiment, entity, subject, location, weblink(s) to access the news item(s) etc.). In some embodiments, the content presentation module 360 may output news content in the form of a table (e.g., in which the table summarizes each news item and its attributes and/or weblinks to access the news items). In some embodiments, the table may be sortable in order for the user to quickly identify news items related to a particular subject, domain, location, sentiment magnitude value, etc.

Figure 4:
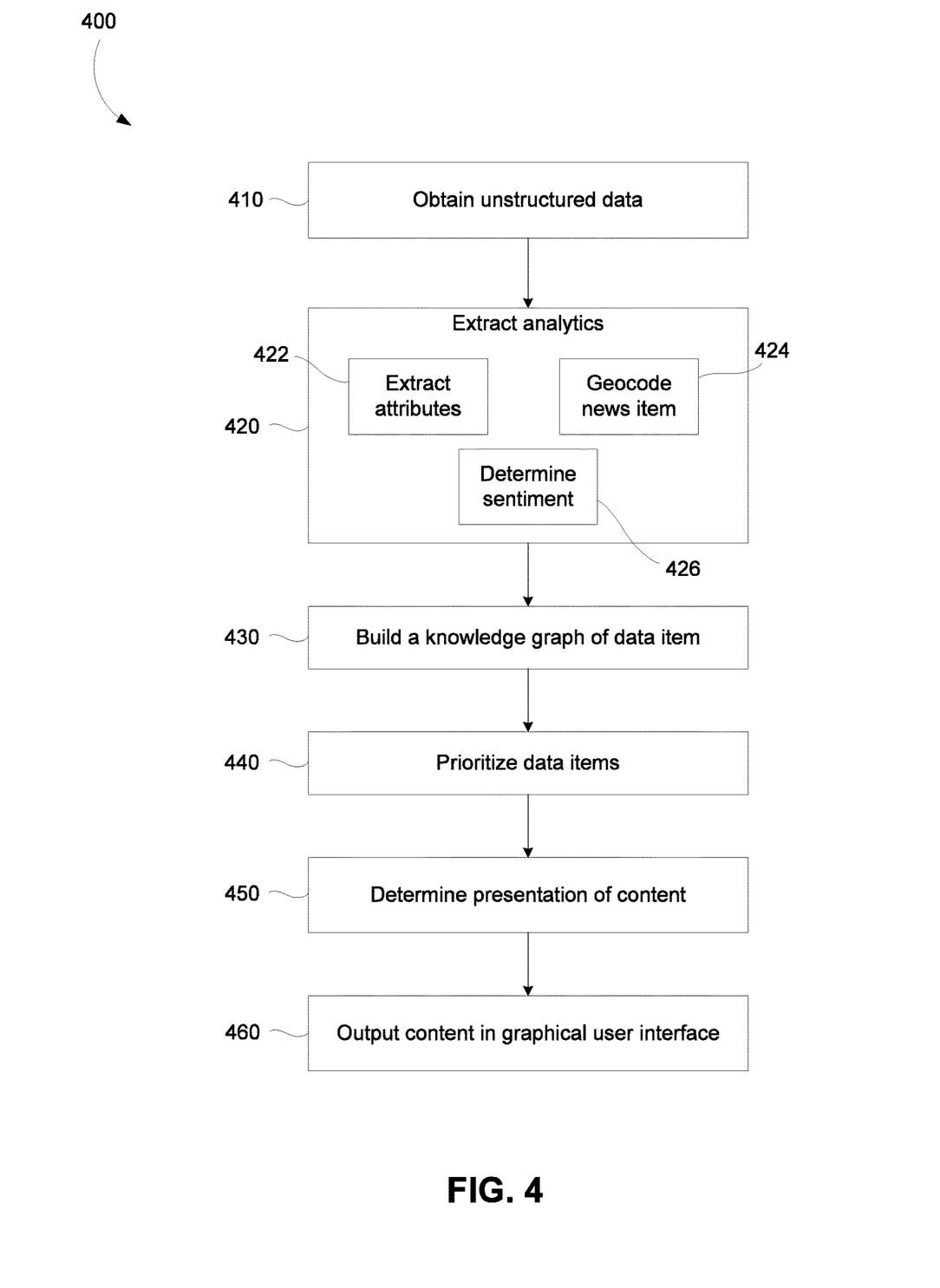
FIG. 4 illustrates an example flowchart of a process for curating and presenting news content, according to an embodiment.

FIG. 4 illustrates an example flowchart of a process for curating and presenting news content. The blocks of FIG. 4 may be implemented in the environment of FIG. 4, for example, and are described using reference numbers of elements depicted in FIG. 4. As noted above, the flowchart illustrates the architecture, functionality, and operation of possible implementations of systems, methods, and computer program products according to various embodiments of the present disclosure.

As shown in FIG. 4, process 400 may include obtaining unstructured data (as at 410). For example, as described above with respect to the unstructured data intake module 310, the unstructured analytics processing system 210 may obtain unstructured data (e.g., news content) from the unstructured data sources 220 (e.g., on a push and/or pull basis, using a news service, crawling the unstructured data sources 220, etc.). In some embodiments, the news content may include structured and/or unstructured raw data, (e.g., text articles, transcribed news audio/video, etc.). As further described herein, the unstructured analytics processing system 210 may generate respective data records (e.g., in a data structure) for news items included in the news content.

Process 400 also may include extracting analytics (as at 420). For example, as described above with respect to the natural language processing module 320, the unstructured analytics processing system 210 may extract analytics (e.g., from the unstructured data obtained at block 410). More specifically, the unstructured analytics processing system 210 may extract analytics associated with an item (e.g., news item) and associate the data record of the news item to the extracted analytics. In some embodiments, extracting the analytics may involve extracting attributes (as at 422), geocoding the news item (as at 424), and/or determining sentiment (as at 426). In some embodiments, the unstructured analytics processing system 210 may apply any variety of techniques to extract the news analytics for a news item. For example, the unstructured analytics processing system 210 may apply NLP techniques and/or other suitable techniques to identify attributes of the news item, such as subject, type of news, entity, agency, identity of the news source (e.g., journalist, author, news outlet description, etc.). In some embodiments, the unstructured analytics processing system 210 may further apply NLP and/or other suitable techniques to identify sentiment of the news item, and determine a sentiment magnitude value. The unstructured analytics processing system 210 may store (e.g., in the data structure) information linking the sentiment with the data record representing the news item. The unstructured analytics processing system 210 may also geocode the news item (e.g., by linking geographic information of the news item to the data record representing the news item).

Process 400 further may include building a knowledge graph of a data item (as at 430). For example, as described above with respect to the relationship identification module 340, the unstructured analytics processing system 210 may build a knowledge graph of a data item (e.g., news item) by determining the relationship between the news item and any variety of subjects or domains. As an example, the unstructured analytics processing system 210 may analyze the extracted analytics for a news item (e.g., extracted by the at block 420) and identify the relationship between the news item and a variety of subjects and domains (e.g., the relationship a news item has to an entity, a company, a task, a project, etc.). Additional levels of relationship analysis may be performed. Using the identified relationships, the unstructured analytics processing system 210 may build a knowledge graph that may be later presented to the user and may also be used to help identify/prioritize news items of interest.

In some embodiments, process blocks 410 to 430 may be repeated for all data items included in the unstructured data. In this way, a data structure is built in which the data structure stores data records representing different news items, and analytics associated with each news item.

Process 400 also may include prioritizing data items (as at 440). For example, as described above with respect to the relevancy and display rules repository 350 and the content presentation module 360, the unstructured analytics processing system 210 may prioritize multiple data items (e.g., news items) based on scoring, ranking, relevancy, and/or prioritization rules. As described herein, these rules may be user defined. Additionally, or alternatively, the rules may be updated dynamically based on industry trends indicating attributes of interest to a particular industry, user historical feedback indicating attributes of news items considered to be relevant to a user, user job role, user's industry, user's interests, user's social media activity indicting the user's interest, etc. In some embodiments, the scoring and/or ranking rules may specify attributes such as sentiment, entity, location, subject, company, basin information, field, etc.

Process 400 further may include determining presentation of content (as at 450). For example, as described above with respect to the relevancy and display rules repository 350 and content presentation module 360, the unstructured analytics processing system 210 may determine display parameters, or, more specifically, the parameters of data points representing content, such as news content (e.g., stored by the relevancy and display rules repository 350). As described herein, the unstructured analytics processing system 210 may determine display parameters such as size, shape, color, shading, icons, etc. In some embodiments, the display parameters may be based on display parameter rules stored by the relevancy and display rules repository 350. As described herein, the display parameter rules may define the display parameters based on the rankings/scorings of news items, sentiment information, entity information, quantity of news items having a set of attributes, etc. Thus, the unstructured analytics processing system 210 may determine the display parameters based on the rules and based on the analytics and relationships of news content determined at blocks 410 to 430.

Process 400 also may include outputting content in a graphical user interface (as at 460). For example, as described above with respect to the content presentation module 360, the unstructured analytics processing system 210 may present data points that summarize the unstructured content in which the data points represent one or more data items (e.g., news items). Further, the unstructured analytics processing system 210 may present the data points in accordance with the display parameters (e.g., determined at block 450). More specifically, the unstructured analytics processing system 210 may present data points (representing one or more news items) with various sizes, colors, shapes, icons, shadings, etc. The presentation of the data points may also represent the relevancy rankings of news items, sentiment of the news items, etc. In this way, a user may quickly identify news items having relevancy to the user.

Figure 5:
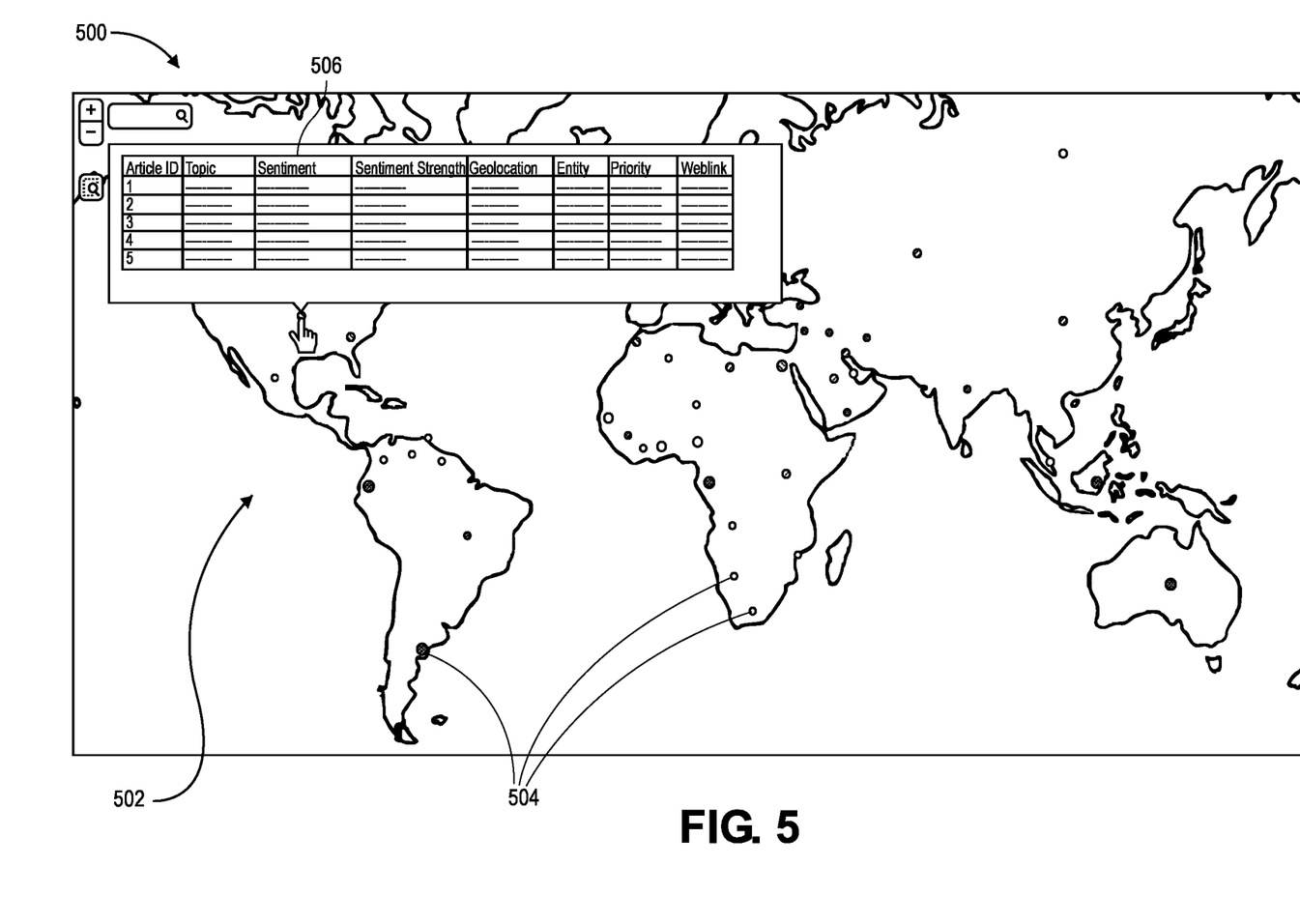
FIG. 5 illustrates an example user interface that summarizes unstructured content in the form of data points representing one or more data items (e.g., news items), according to an embodiment.

FIG. 5 illustrates an example user interface that summarizes unstructured content in the form of data points representing one or more data items (e.g., news items). As shown in FIG. 5, the interface 500 may include a geographic map 502 (e.g., of the world) with data points 504 overlaid over the geographic map 502. The data points may be overlaid at locations on the map representing the geographic location of one or more news items represented by the data points. In some embodiments, different data points may have different appearances (e.g., different sizes, colors, shapes, shadings, etc.). The appearance represents different analytics, attributes, levels of relevancy, sentiment, etc. of news items. For example, data points representing news items having a relatively high level of relevance and a relatively high level of negative sentiment may be relatively large and colored red (e.g., to signify to the user the location having news items of high relevancy with strong negative sentiment).

As further shown in FIG. 5, a data point may be selected by the user. For example, a user may select a data point indicating one or more relevant news items. Upon selection of the data point, the content presentation module 360 may present a table 506 having additional information associated with one or more news items represented by the data point (e.g., sentiment, entity, subject, location, weblink(s) to access the news item(s) etc.). In this way, a user may quickly identify geographic locations having news items of importance, and by selecting a data point, the user may further identify news items and analytics associated with each news item. As such, the identification and presentation of relative news items is concisely presented, saving the user time and reducing the likelihood that the user may overlook relevant news items.

In one example use case, the interface 500 may display data points representing news items relevant to oil and gas exploration. The appearance of the data points may be such that news items of high relevance to oil and gas exploration may be relatively large. Further, the data points may be color coded based on sentiment (e.g., red for strong negative sentiment and green for strong positive sentiment, and grey for a neutral sentiment). In this way, the user may quickly identify geographic areas where oil and gas exploration may be further researched for exploration, or areas in which oil and gas exploration may be avoided. Other examples and use cases are possible using the techniques described herein. In some embodiments, the interface 500 may include a dialogue box in which a user may provide input to modify the appearance options for the data points (e.g., so that the data points appear different based on a set of user inputs).

Figure 6:
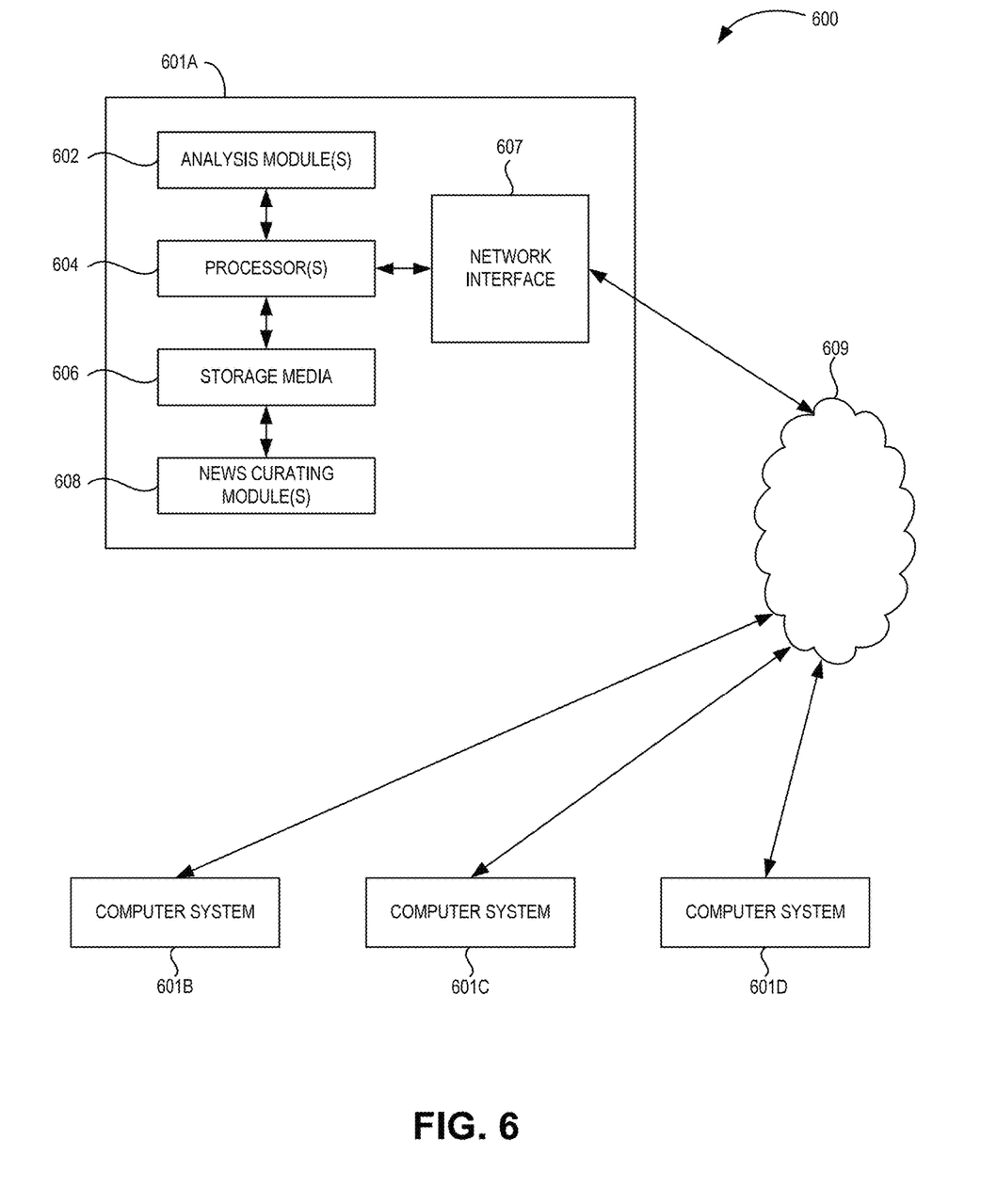
FIG. 6 illustrates a schematic view of a computing system, according to an embodiment.

In some embodiments, the methods of the present disclosure may be executed by a computing system. FIG. 6 illustrates an example of such a computing system 600, in accordance with some embodiments. The computing system 600 may include a computer or computer system 601A, which may be an individual computer system 601A or an arrangement of distributed computer systems. The computer system 601A includes one or more analysis modules 602 that are configured to perform various tasks according to some embodiments, such as one or more methods disclosed herein. To perform these various tasks, the analysis module 602 executes independently, or in coordination with, one or more processors 604, which is (or are) connected to one or more storage media 606. The processor(s) 604 is (or are) also connected to a network interface 607 to allow the computer system 601A to communicate over a data network 609 with one or more additional computer systems and/or computing systems, such as 601B, 601C, and/or 601D (note that computer systems 601B, 601C and/or 601D may or may not share the same architecture as computer system 601A, and may be located in different physical locations, e.g., computer systems 601A and 601B may be located in a processing facility, while in communication with one or more computer systems such as 601C and/or 601D that are located in one or more data centers, and/or located in varying countries on different continents).

A processor may include a microprocessor, microcontroller, processor module or subsystem, programmable integrated circuit, programmable gate array, or another control or computing device.

The storage media 606 may be implemented as one or more computer-readable or machine-readable storage media. Note that while in the example embodiment of FIG. 6 storage media 606 is depicted as within computer system 601A, in some embodiments, storage media 606 may be distributed within and/or across multiple internal and/or external enclosures of computing system 601A and/or additional computing systems. Storage media 606 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above may be provided on one computer-readable or machine-readable storage medium, or may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

In some embodiments, computing system 600 contains one or more news curating module(s) 608. In the example of computing system 600, computer system 601A includes the news curating module 608. In some embodiments, a single news curating module may be used to perform some aspects of one or more embodiments of the methods disclosed herein. In other embodiments, a plurality of news curating modules may be used to perform some aspects of methods herein.

It should be appreciated that computing system 600 is merely one example of a computing system, and that computing system 600 may have more or fewer components than shown, may combine additional components not depicted in the example embodiment of FIG. 6, and/or computing system 600 may have a different configuration or arrangement of the components depicted in FIG. 6. The various components shown in FIG. 6 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are included within the scope of the present disclosure.

Computational interpretations, models, and/or other interpretation aids may be refined in an iterative fashion; this concept is applicable to the methods discussed herein. This may include use of feedback loops executed on an algorithmic basis, such as at a computing device (e.g., computing system 600, FIG. 6), and/or through manual control by a user who may make determinations regarding whether a given step, action, template, model, or set of curves has become sufficiently accurate for the evaluation of the subsurface three-dimensional geologic formation under consideration.

The foregoing description, for purpose of explanation, has been described with reference to specific embodiments. However, the illustrative discussions above are not intended to be exhaustive or limiting to the precise forms disclosed. Many modifications and variations are possible in view of the above teachings. Moreover, the order in which the elements of the methods described herein are illustrate and described may be re-arranged, and/or two or more elements may occur simultaneously. The embodiments were chosen and described in order to best explain the principals of the disclosure and its practical applications, to thereby enable others skilled in the art to best utilize the disclosed embodiments and various embodiments with various modifications as are suited to the particular use contemplated.

What is claimed is:

1. A computer-implemented method, comprising:
obtaining unstructured data content from one or more data sources representing a geologic environment;
extracting, using a computer, analytics associated with the unstructured data content, wherein the extracting comprises:
converting the unstructured data content to structured data content, wherein the converting comprises determining sentiment in the unstructured data content using natural language processing, determining relevancy of the unstructured data content to an entity, a company, a task, a project, or a combination thereof, and geocoding the unstructured data content; and
ranking the unstructured data content based on the determined relevancy;
generating, using the computer, an oil and gas exploration model representing at least a portion of the geologic environment associated with the structured data content;
inputting the structured data content into the oil and gas exploration model, wherein the oil and gas exploration model is configured to generate an output for consideration during an oil and gas exploration decision;
determining presentation parameters for presenting the unstructured data content as a data point at a location in a map view representing a geographic location associated with the unstructured data content, wherein the presentation parameters are determined by filtering the unstructured data content based on the extracted analytics and prioritizing the filtered unstructured data content for presentation based on display rules that prescribe an appearance for the data point based at least partially on a number of items of the unstructured data content associated with a location associated with the unstructured data content, the determined relevancy, and the determined sentiment;
automatically selecting the appearance of the data point representing the unstructured data content associated with a particular geographical location based on the presentation parameters wherein the appearance of the data points is configured to differentiate between locations having unstructured data content based on the determined relevancy, the determined sentiment, a sentiment strength, or an amount of unstructured data;
building and displaying a user interface that represents the data point using the appearance that was selected in the map view based on the presentation parameters, wherein the user interface permits user interaction with the data point in the map view; and
identifying, based on the appearance of the data point, one or more candidate geographic areas for further oil and gas exploration.

2. The method of claim 1, wherein the data point represents one or more news items.

3. The method of claim 2, further comprising:
receiving a user selection of the data point; and
providing additional information regarding the one or more news items represented by the data point.

4. The method of claim 2, wherein at least one of the presentation parameters is defined based on attributes of the unstructured data content and not based on user interaction with the user interface.

5. The method of claim 4, wherein the presentation parameters include at least one selected from the group consisting of:
size;
color;
shape;
shading;
pattern; and
icon.

6. The method of claim 1, wherein the determining the presentation parameters is further based on relevancy.

7. The method of claim 1, wherein the extracting the analytics comprises building a knowledge graph.

8. The method of claim 1, wherein the display rules include rules for the appearance of the data point based on a sentiment value, a relevancy value, or both.

9. The method of claim 1, further comprising adjusting the display rules based on industry trends indicating attributes of interest to a particular industry, user feedback, the user interaction with the data point, user job role, user industry, user interests, user social media activity, or a combination thereof.

10. The method of claim 1, further comprising:
receiving a user selection of the data point; and
providing a list of the one or more data sources related to one or more news items represented by the data point, wherein the list of the one or more data sources is based on a priority rank of the determined sentiment, the determined relevancy, and the particular geological location associated with the unstructured data content represented by the data point.

11. A computing system, comprising:
one or more processors; and
a memory system comprising one or more non-transitory computer-readable media storing instructions that, when executed by at least one of the one or more processors, cause the computing system to perform operations, the operations comprising:

obtaining unstructured data content from one or more data sources representing a geologic environment;

extracting, using a computer, analytics associated with the unstructured data content, wherein the extracting comprises:
  converting the unstructured data content to structured data content, wherein the converting comprises determining sentiment in the unstructured data content using natural language processing, determining relevancy of the unstructured data content to an entity, a company, a task, a project, or a combination thereof, and geocoding the unstructured data content; and
  ranking the unstructured data content based on the determined relevancy;

generating, using the computer, an oil and gas exploration model representing at least a portion of the geologic environment associated with the structured data content;

inputting the structured data content into the oil and gas exploration model, wherein the oil and gas exploration model is configured to generate an output for consideration during an oil and gas exploration decision;

determining presentation parameters for presenting the unstructured data content as a data point at a location in a map view representing a geographic location associated with the unstructured data content, wherein the presentation parameters are determined by filtering the unstructured data content based on the extracted analytics and prioritizing the filtered unstructured data content for presentation based on display rules that prescribe an appearance for the data point based at least partially on a number of items of the unstructured data content associated with a location associated with the unstructured data content, the determined relevancy, and the determined sentiment;

automatically selecting the appearance of the data point representing the unstructured data content associated with a particular geographical location based on the presentation parameters, wherein the appearance of the data points is configured to differentiate between locations having unstructured data content based on the determined relevancy, the determined sentiment, a sentiment strength, or an amount of unstructured data;

building and displaying, by the one or more processors, a user interface including the data point having the appearance that was selected and representing the unstructured data content, wherein the user interface includes the map view, including a representation of the data point, based on the presentation parameters; and identifying, based on the appearance of the data point, one or more candidate geographic areas for further oil and gas exploration.

12. The computing system of claim 11, wherein the data point represents one or more news items.

13. The computing system of claim 12, further comprising:
  receiving a user selection of the data point; and
  providing additional information regarding the one or more news items represented by the data point.

14. The computing system of claim 12, further comprising:
  receiving a user selection of the data point; and
  providing a list of the one or more data sources related to one or more news items represented by the data point, wherein the list of the one or more data sources is based on a priority rank of the determined sentiment, the determined relevancy, and the particular geological location associated with the unstructured data content represented by the data point.

15. The computing system of claim 11, wherein the presentation parameters include at least one selected from the group consisting of:
  size;
  color;
  shape;
  shading;
  pattern; and
  icon.

16. The computing system of claim 11, wherein the determining the presentation parameters is further based on the determined relevancy or the display rules.

17. A non-transitory computer-readable medium storing instructions that, when executed by one or more processors of a computing system, cause the computing system to perform operations, the operations comprising:
  obtaining, using a computer, unstructured data content from one or more data sources representing a geologic environment;
  extracting, using the computer, analytics associated with the unstructured data content, wherein the extracting comprises:
    converting the unstructured data content to structured data content using at least natural language processing, wherein the converting comprises determining sentiment in the unstructured data content using the natural language processing, determining relevancy of the unstructured data content to an entity, a company, a task, a project, or a combination thereof, and geocoding the unstructured data content; and
    ranking the unstructured data content based on the determined relevancy;
  generating, using the computer, an oil and gas exploration model representing at least a portion of the geologic environment associated with the structured data content;
  inputting the structured data content into the oil and gas exploration model, wherein the oil and gas exploration model is configured to generate an output for consideration during an oil and gas exploration decision;
  determining presentation parameters for presenting the unstructured data content as a data point at a location in a map view representing a geographic location associated with the unstructured data content, wherein the presentation parameters are determined by filtering the unstructured data content based on the extracted analytics and prioritizing the filtered unstructured data content for presentation based on display rules that prescribe an appearance for the data point based at least partially on a number of items of the unstructured data content associated with a location associated with the unstructured data content, the determined relevancy, and the determined sentiment;
  automatically selecting the appearance of the data point representing the unstructured data content associated with a particular geographical location based on the presentation parameters, wherein the appearance of the data points is configured to differentiate between locations having unstructured data content based on the determined relevancy, the determined sentiment, a sentiment strength, or an amount of unstructured data;
  building and displaying a user interface that represents the data point using the appearance that was selected in the map view based on the presentation parameters, wherein the user interface permits user interaction with the data point in the map view; and identifying, based on the appearance of the data point, one or more candidate geographic areas for further oil and gas exploration.

18. The computer-readable medium of claim 17, wherein the data point represents one or more news items.

19. The computer-readable medium of claim 18, wherein the presentation parameters include at least one selected from the group consisting of:

size;
color;
shape;
shading;
pattern; and
icon.

* * * * *